Figure 1:
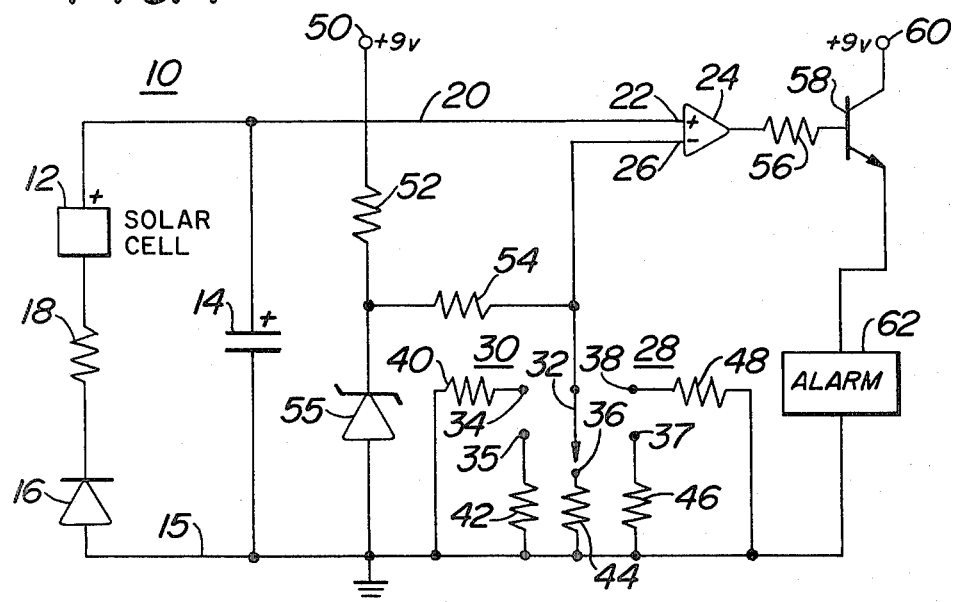

United States Patent [19]

Tulenko et al.

[11] 4,229,733
[45] Oct. 21, 1980

[54] EXPOSURE DETECTING DEVICE

[75] Inventors: Thomas N. Tulenko, 2132 Spruce St., Philadelphia, Pa. 19103; Carmen A. Di Camillo, Philadelphia, Pa.

[73] Assignee: Thomas N. Tulenko, Philadelphia, Pa.

[21] Appl. No.: 932,553

[22] Filed: Aug. 10, 1978

[51] Int. Cl.² ............ G08B 23/00; G08B 17/12; G01J 1/42
[52] U.S. Cl. .................. 340/500; 340/511; 340/530; 340/573; 340/578; 340/600; 250/372; 250/388
[58] Field of Search ............ 340/500, 501, 511, 530, 340/573, 578, 584, 588, 589, 600; 250/336, 378, 388, 372; 325/364, 466

[56] References Cited

U.S. PATENT DOCUMENTS

| | | | |
|---|---|---|---|
| 3,277,300 | 10/1966 | Kerr et al. | 250/351 |
| 3,277,458 | 10/1966 | Greenwood | 340/588 |
| 3,443,097 | 5/1969 | Smith | 250/388 |
| 3,576,995 | 5/1971 | Nirschl | 250/388 |
| 3,652,877 | 3/1972 | Smith | 250/336 |
| 3,749,915 | 7/1973 | Hagood et al. | 250/336 |
| 3,878,496 | 4/1975 | Erickson | 340/573 |
| 3,987,319 | 10/1976 | Nirschl | 340/600 |
| 3,999,061 | 12/1976 | McLaughlin | 250/214 |
| 4,015,116 | 3/1977 | Bahm | 250/206 |
| 4,065,758 | 12/1977 | Barbier et al. | 340/600 |

*Primary Examiner*—John W. Caldwell, Sr.
*Assistant Examiner*—Donnie L. Crosland
*Attorney, Agent, or Firm*—Jacob Trachtman

[57] ABSTRACT

An exposure detecting device comprising a radiation detector means providing an output signal responsive to the intensity of received ultraviolet radiation, a storage means receiving the output signal of said detector means and providing an output signal which increases as a function of the signal received and its duration, and decreases in the absence of a received signal as a predetermined function of time. A sensitivity control means provides a reference signal, and comparing means receives the output signal of said storage means and the reference signal of said sensitivity control means and delivers an output signal when the storage means output signal exceeds a predetermined value with respect to the reference signal. Alarm means is activated upon receiving an output signal from said comparing means providing an alarm.

14 Claims, 2 Drawing Figures

CAPACTOR VOLTAGE VARIATIONS

TIME (HOURS)

EXPOSURE DETECTING DEVICE

The invention relates to an exposure detecting device, and more particularly to a portable device used for providing an alarm to warn that exposure to the sun's radiation has reached a limit after which further exposure will be harmful to human skin.

Heretofore radiation exposure meters and devices have been provided for warning the user of a harmful level of radiation intensity. Such devices have been used in connection with human exposure to radioactive materials, and for measuring and integrating radiation received by plants. Light meters are also available for measuring exposure times used in photography for obtaining desired results. The prior art devices, however, have not provided means for monitoring the users exposure to sunlight to prevent sunburn and provide warnings over an extended period of time whenever exposure limit is being exceeded taking into account previous exposures to which the user has been subjected. Such a device preferrably should take into consideration the intensity of sunlight, the duration of exposure, and the time elapsed between exposures during which recovery can take place to prior exposure to the sun. Since the sensitivity to sunlight varies from person to person and with suntan previously attained, it is also desirable to provide for adjusting the sensitivity of the device and level at which it indicates that the safe limit has been reached.

It is, therefore, a primary object of the invention to provide a new and improved exposure detecting device which provides an alarm when exposure to the sun exceeds a safe limit.

Another object of the invention is to provide a new and improved exposure detecting device which has a memory for provious exposure to sunlight and takes this into account when providing an alarm for indicating that the safe limit for exposure has been reached on subsequent exposures.

Another object of the invention is to provide a new and improved exposure detecting device which is portable and may be adjusted by a user for the particular sensitivity of the user's skin to sunlight for indicating when a safe limit of exposure has been reached.

Another object of the invention is to provide a new and improved exposure detecting device which is responsive to variations in the intensity of sunlight and exposure duration, as well as times during which exposure is absent for indicating when a safe limit of exposure has been reached and is about to be exceeded.

Another object of the invention is to provide a new and improved exposure detecting device which may easily be used to protect against sunburn, is inexpensive to manufacture, and is durable and reliable in operation.

The above objects and advantages of the invention as well as other advantages are achieved by providing an exposure detecting device having a detector sensitive to the sun's radiation in the ultraviolet range. The detector means provides an output signal which is responsive to the intensity of the ultraviolet ray radiation which is received by storage means. The storage means provides an output signal which increases as a function of the signal from the detector means and its duration, and decreases in the absence of an input signal as a predetermined function of time. A sensitivity control means is provided which delivers a reference signal to a comparing means which also receives the output signal of the storage means. The comparing means delivers an output signal when the storage means output signal exceeds a predetermined value determined with respect to the reference signal. The output signal from the comparing means activates an alarm means which indicates that the safe limit for radiation has been reached and will be exceeded unless further exposure to radiation is limited.

Figure 2:
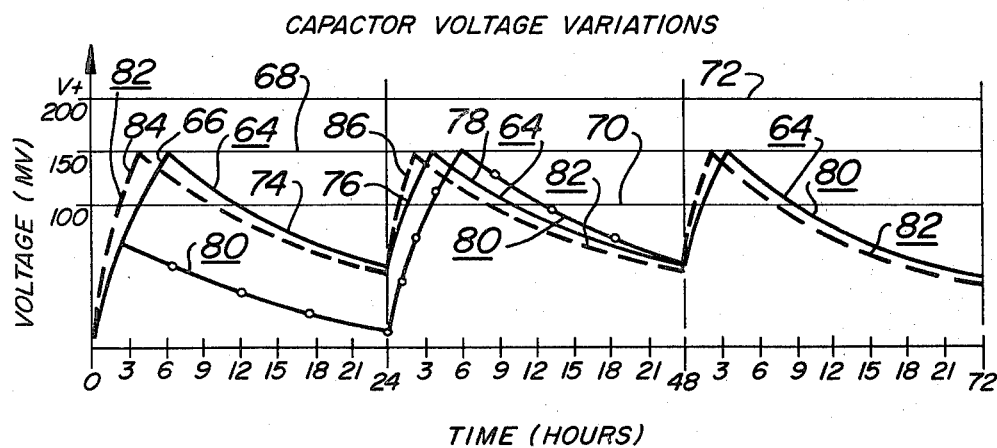

The foregoing and other objects and advantages of the invention will become more apparent as the following detailed description is read in conjunction with the drawing, in which:

FIG. 1 is a schematic diagram of an exposure detecting device embodying the invention, and FIG. 2 is a graph representing signals produced by the exposure detecting device and illustrating the operation thereof.

FIG. 1 is a schematic diagram of an exposure detecting device 10 embodying the invention. The device 10 includes a detector means 12 which may be a selenium solar cell with a band pass filter which allows detection of only the ultraviolet light harmful to human skin. Such radiation in the range of wavelengths 300 to 400 nm can cause severe sunburn when human skin is exposed to it for a period exceeding a safe limit which is determined by skin sensitivity, radiation intensity, and time duration between exposures for allowing recovery.

The detector means 12 provides an output voltage which is delivered to a storage means comprising an electrical capacitor 14 connected in series with a unidirectional current limiting means comprising a diode 16 in series with a current limiting resistor 18. The junction between the capacitor 14 and the anode of the diode 16 is joined to a ground potential bus 15. The receipt of ultraviolet radiation by the detector means 12 results in the application of an output voltage to the capacitor 14 which causes the charging of the capacitor 14. The charge on the capacitor 14 increases as a function of time and provides an output voltage on the line 20.

The charging rate of the capacitor 14 is a function of the intensity of radiation received by the detector means 12 and the time constant provided by the capacitor and series diode 16 and resistor 18 combination. Since the diode 16 is biased in the forward direction during the charging of the capacitor, it provides a minimum resistance, and the resistance of the time constant is provided mainly by the limiting resistor 18. In the absence of ultraviolet radiation the detector means 12 does not provide an output signal causing the capacitor 14 to discharge through the series path provided by the detector means 12, resistor 18 and diode 16. The flow of current is now in the direction opposite to the charging current and back biases the diode 16. The diode 16, which may be a silicon diode, at this time provides high reverse resistance, and a time constant which is much higher than that for the charging circuit. Thus, for example, if the detector device 12 is a selenium solar cell providing a maximum output voltage of 300 mv through a 1 megaohm resistor 18 to the capacitor 14 of 680 microfarads, the capacitor 14 may be charged to 200 mv in a time of 4 to 6 hours depending upon the intensity of the radiation received. The high reverse resistance provided by the diode 16 to the discharge current of the capacitor 14 when the voltage of the detector means 12 is removed, causes the voltage of the capacitor 14 to decrease to approximately half its value during a period of 18 to 20 hours. This charging and discharging action of the storage capacitor 14 and its utilization in the exposure detecting device 10, will be described in greater detail in connection with the graph of FIG. 2.

The signal on the line 20 is delivered to the first input of a signal comparator 24 which may be an operational amplifier with high impedance inputs, while the second input 26 of the comparator 24 receives a reference signal from a sensitivity control means 28. The sensitivity control means 28 is adjusted for the user's skin sensitivity to ultraviolet radiation and includes a switch 30 having a contact arm 32 having respective contact positions for selectively engaging one of five contacts 34-38. Each of the contacts 34 to 38 is connected through a respective resistor 40, 42, 44, 46, 48 of respectively increasing values of resistance to the ground potential bus 15. The contact arm 32 of the switch 30 is connected to a voltage potential of 9 volts at a terminal 50 through series connected resistors 52 and 54. The junction of resistors 52 and 54 is connected to the ground potential bus 15 through a zener diode 55 which maintains the voltage at the junction point at 6.2 volts. The contact arm 32 of switch 30 is also connected directly to the reference input 26 of the comparator means 24 and delivers a selected reference voltage depending upon its contact position. The reference voltages provided are positive with respect to ground potential and have lower and higher values which are selected for delivery by the switch 30.

The comparator means 24 delivers an output signal depending upon the relationship of the values of the signals delivered to its inputs 22 and 26. When the voltage signal on the line 20 increases with the charging of the capacitor 14 to a predetermined level with respect to the reference voltage at input 26, the comparator 24 provides an output signal through limiting resistor 56 to the base electrode of a control transistor 58. The control transistor 58 has its collector electrode joined to 9 volt supply at terminal 60 and an emitter electrode connected to an alarm device 62 which may be an audible alarm in the form of a buzzer. With the delivery of a signal to the normally non-conductive transistor 58, it becomes conductive providing energization to the alarm 62 for producing an alarm signal.

For a description in greater detail of the operation of the exposure detecting device 10 refer to FIG. 2. The curves of the graph of FIG. 2 represent the voltage stored by the capacitor 14 and delivered to the line 20 of the device 10 plotted against time in hours. Thus, the curve 64 has an initial exponentially rising portion 66 during which the detector means 12 receives ultraviolet radiation and provides an output voltage signal to the capacitor 14. The curve continues to rise until it reaches a value of 150 mv indicated by the horizontal line 68. The line 68, and the other lines 70 and 72 which are at 100 mv and 200 mv levels respectively, represent several of the reference signal values provided by the switch 30 of the sensitivity control means 28. Thus, with the switch 30 set to deliver a reference signal to the comparator 24 represented by the line 68, the comparator 24 provides an output signal energizing the alarm 62, when the portion 66 of curve 64 reaches, for example, the level of line 68.

From the graph of curve 64, it is also evident that starting at 0 hours, the rising portion 66 of the curve 64 reaches the alarm level 68 after a period of about 6 hours. In the absence of further radiation, the voltage on the capacitor 14 is reduced exponentially as indicated by the falling portion 74 of the curve 64. The decreasing voltage results from discharge of the capacitor 14 through the high resistance provided by the back biased diode 16.

After a lapse of an initial 24 hour period, if the sybject is again exposed to ultraviolet radiation, the curve 64 which did not return to the 0 voltage level, rises again as shown by the portion 76 of the curve 64. Since the curve 76 starts its rise from higher level, it reaches the line 68 after an elapse of approximately 3 ½ hours, at which time the alarm is again activated. The removal of ultraviolet radiation once more results in a exponentially decreasing voltage on the capacitor 14 shown by the portion 78 of the curve 64. It is noted that because of the prior exposure of 6 hours, the amount of exposure during the following 24 hours was reduced to 3 ½ hours. The absence of exposure until the beginning of the next 24 hours (as shown as an elapse of 48 hours on the graph) allows the voltage to decrease to point where the subject may again be exposed for a period of 3 ½ hours before the alarm is energized. Thus, the device 10 takes into account the prior history of exposure of the subject, and the opporturnity for healing of the skin which takes place during the time when it is not exposed to ultraviolet radiation, for determining the allowable exposure during subsequent periods. Since different persons may be more or less sensitive to ultraviolet radiation, the alarm level such as represented by the line 68, 70 and 72 may be selected by the switch 30 of the sensitivity control for determining the safe point at which the alarm should be activated. This level may also be changed as the person's skin becomes tanned and less sensitive to the effects of radiation, at which time the alarm level may be adjusted to a higher value by an appropriate setting provided by switch 30.

The curve 80 of the FIG. 2 represents a situation where the subjct is exposed to radiation for a short period of one or two hours, so that the voltage on the capacitor 14 has not reached the level 68 selected for activating the alarm. The capacitor 14 as indicated by the curve 80 discharges and has its voltage reduced to substantially zero level over the 24 hour period. Thus, at the beginning of the second 24 hour period the alarm level 68 is not reached until after an elaspe of 6 hours, since only a small amount of radiation was received during the prior period. After the lapse of 48 hours, the curve 80 like the curve 64 allows exposure for a period of 3 ½ hours before the alarm is energized. In this manner, depending upon the duration of exposure and the time elapsed from such exposure, the device 10 provides alarm signals which depend upon the exposure pattern to which the person has been subjected.

FIG. 2 also illustrates by the curve 82, the effect caused by different intensities of ultraviolet radiation. With an increase in radiation intensity, the curve 82 provides a more steeply rising portion 84 which charges the capacitor 14 to the level 68 during a period of approximately 4 hours. With the termination of such exposure, the curve 82 illustrates the exponentially decreasing voltage on a capacitor 14 until the elapse of 24 hours. When intense radiation is again present, it causes the voltage represented by the portion 86 of the curve 82 to increase to the alarm level 68 within a receiving time of 2 hours. When the subject is thereafter removed from radiation, the curve also decreases but again not to the zero level. At the beginning of the third 24 hour period (shown as an elapsed time of 48 hours), the more intense radiation results in an exposure time limit of 2 hours after which the voltage level again decreases in the absence of exposure as illustrated. The curve 82, thus, illustrates the great versatility provided by the exposure detecting device 10, which allows it to accommodate for various intensities and durations of radiation, while taking into account a person's skin sensitivities, and allowing adjustment of the alarm level to the degree desired by the user for protection against the harmful effects of radiation.

The fact that the exposure detecting device 10 is small, light and highly portable is most essential for its use in being worn upon the body of a user for receiving radiation exposure representative of that to which the user is subject. Since the normal senses cannot be relied upon, very harmful exposure to radiation may be received before the exposed person is aware of this, so that the device 10 serves a very useful purpose. Many persons who relax in the sun and desire to limit their exposure, fail to do so by being unaware of the elapsed time or by falling asleep to find that they have been over exposed. On the other hand, those who desire to obtain a suntan during the shortest possible time without risk of over exposure, can subject themselves to the sun at various times and by the alarm provided by the device 10 receive exposure up to the safe limit for each exposure period.

It will, of course, be understood that the description and drawing herein contained are illustrative merely, and that various modifications and changes may be made in the method disclosed without departing from the spirit of the invention.

What is claimed is:

1. An exposure detecting device for determining the safe limit for exposure of a subject to ultraviolet radiation comprising a radiation detector means for sensing radiation received by a subject and providing an output signal responsive to the intensity of received ultraviolet radiation, a storage means receiving the output signal of said detector means and providing an output signal which increases as a function of the received output signal and its duration, and decreases in the absence of a received signal as a predetermined function of time corresponding to the recovery rate of the subject to the radiation, a sensitivity control means providing a reference signal related to the sensitivity of the subject to the radiation, comparing means receiving the output signal of said storage means a reference signal from said sensitivity control means and delivering an output signal when the storage means output signal exceeds a predetermined value with respect to the reference signal, and alarm means activated upon receiving an output signal from said comparing means.

2. The exposure detecting device of claim 1 in which said detector means is a voltage generating cell, and said storage means is a capacitor which is charged by said cell.

3. The exposure detecting device of claim 2 in which the capacitor has a charging time constant which exceeds its discharging time constant.

4. The exposure detecting device of claim 3 including a unidirectional conducting device connected in a series circuit with said cell and capacitor and providing a low forward resistance during the charging of said capacitor by said cell and a high reverse resistance during the discharge of said capacitor.

5. The exposure detecting device of claim 4 in which the cell is a selenium solar cell and said unidirectional device include a diode element and a series connected current limiting resistance.

6. The exposure detecting device of claim 1 in which said sensitivity control means provides a selected one of a plurality of reference signals to said comparing means.

7. The exposure detecting device of claim 6 in which said sensitivity control means includes a switch element for selecting one of said plurality of reference signals.

8. The exposure detecting device of claim 6 in which said comparing means is an operational amplifier and said alarm means is an audible alarm which is energized by said amplifier.

9. The exposure detecting device of claim 6 in which the detector means is a voltage generating cell, the storage means is a capacitor means which is charged by said cell, and the time constant for charging the capacitor exceeds the time constant for discharging the capacitor.

10. The exposure detecting device of claim 9 including a unidirectional conducting device connected in a series circuit with said cell and capacitor and providing a low forward resistance during the charging of said capacitor by said cell and a high reverse resistance during the discharge of said capacitor.

11. A method of detecting on a current basis the safe limit of exposure to ultraviolet radiation of a subject's skin by taking into account the recovery of the subject in the absence of the radiation, which includes the steps of sensing the intensity and duration of radiation to which a subject is exposed, providing a signal having a value which increases as a function of intensity and duration of the radiation to which the subject is exposed, and decreases in the absence of radiation as a predetermined function of time corresponding to the recovery rate of the subject to the radiation exposure, and providing an alarm when the signal exceeds a reference value for indicating that the safe limit for radiation exposure has been reached.

12. The method of claim 11 in which the signal decreases in the absence of radiation as an exponential function of time.

13. The method of claim 11 in which the reference value of the signal for providing the alarm is adjusted to correspond to the sensitivity of the subject to ultraviolet radiation.

14. The method of claim 12 in which the reference value of the signal for providing the alarm is adjusted to correspond to the sensitivity of the subject to ultraviolet radiation.

* * * * *